Figure 1:
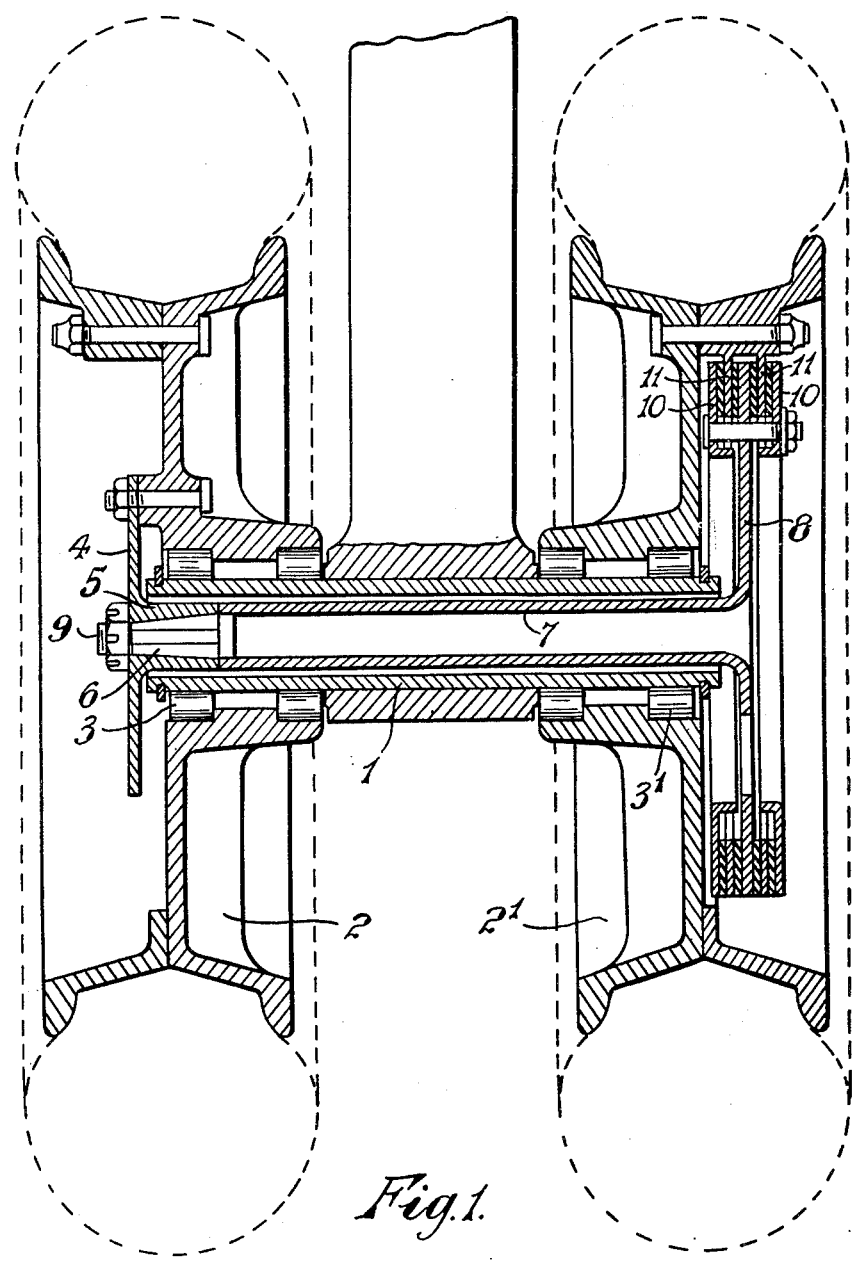

Dec. 2, 1952 H. J. BUTLER 2,620,235
NOSE OR TAIL WHEELS OF AIRCRAFT
Filed Oct. 16, 1948 2 SHEETS—SHEET 1

INVENTOR
Henry James Butler
by Benj. T. Rauber
his attorney

Dec. 2, 1952   H. J. BUTLER   2,620,235
NOSE OR TAIL WHEELS OF AIRCRAFT
Filed Oct. 16, 1948   2 SHEETS—SHEET 2
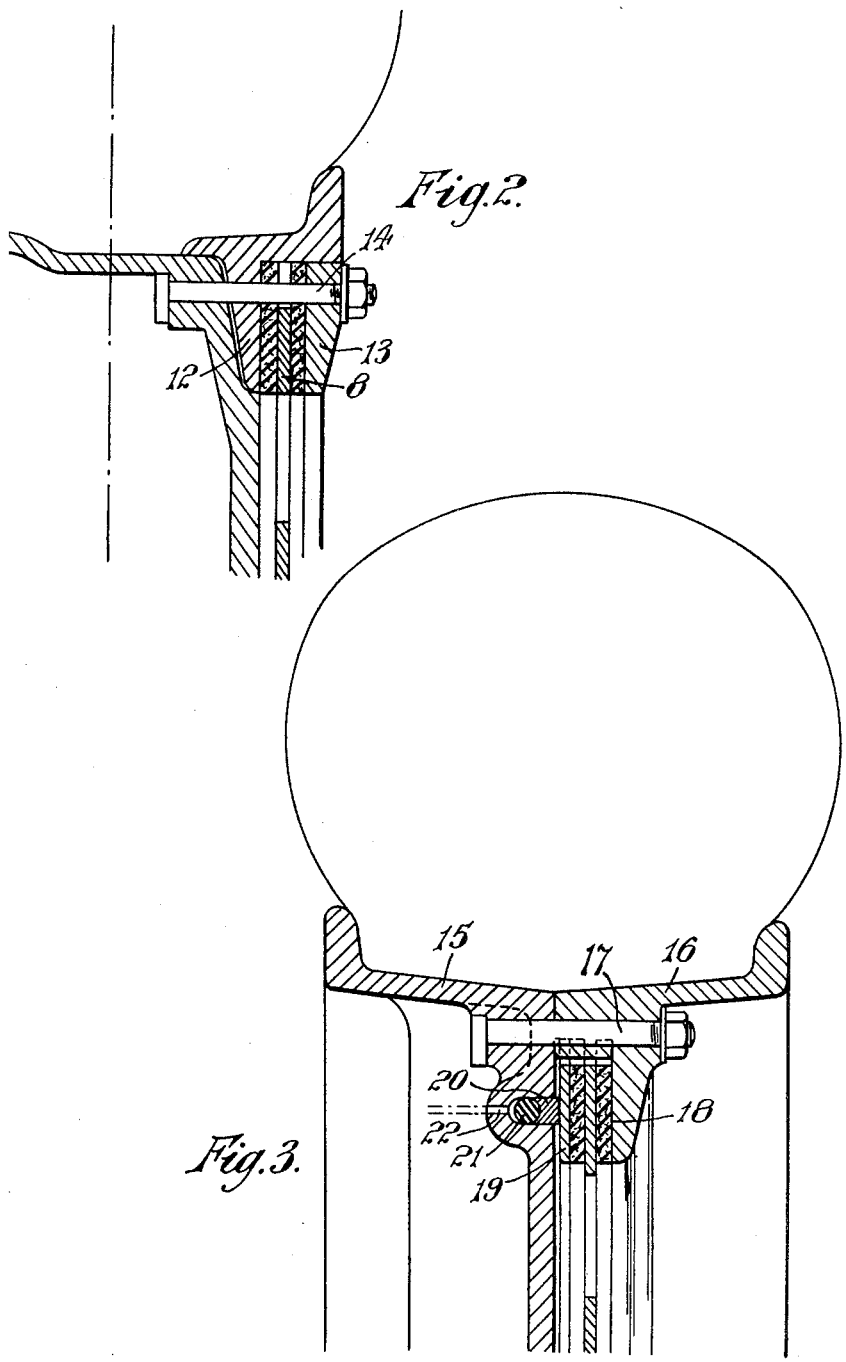
INVENTOR
Henry James Butler
by Benj. T. Rauber
his attorney Patented Dec. 2, 1952

2,620,235

UNITED STATES PATENT OFFICE 2,620,235

NOSE OR TAIL WHEELS OF AIRCRAFT

Henry James Butler, Sutton Coldfield, England, assignor to Dunlop Rubber Company Limited, London, England, a British company Application October 16, 1948, Serial No. 54,879
In Great Britain November 12, 1947

9 Claims. (Cl. 301—36)

This invention relates to improved nose or tail wheels of aircraft.

It is known to mount the nose or tail wheels of aircraft so that they have castoring properties but it is found that such castor wheels when in motion are liable to have a periodic oscillation commonly known as "shimmy." Shimmy may be obviated or reduced by the employment of twin contact tyres such as described in British Patent No. 560,795. It has also been proposed to employ twin wheels, the two wheel elements each fitted with a tyre being mounted to revolve about a common axis and being connected together so as to be incapable of relative motion. This arrangement of twin wheels while effective suffers from the disadvantage that a substantial effort must be exerted by the pilot when attempting to deviate the aircraft from a straight course.

It is an object of the present invention to provide a twin nose or tail wheel for an aircraft which obviates or reduces "shimmy" but permits the aircraft to be steered when the pilot exerts a normal steering force.

According to the present invention twin wheels are rotatably mounted on a common axle and are coupled together by a shaft rigidly connected to one wheel and in frictional engagement with the other.

I have found that if a pair of twin wheels are frictionally coupled together they oppose rapid oscillations such as are the cause of "shimmy" without seriously increasing the effort required to effect the relatively slow movements required for steering.

The invention will now be more particularly described with respect to the specific embodiments shown in the accompanying drawings, these embodiments being similar in construction except in the details of the frictional connection between the wheels.

According to the embodiment shown in cross-section in Figure 1, a twin wheel comprises a hollow axle 1 adapted to be connected at its centre to an aircraft leg and carrying at each end a wheel 2, 2' rotatably mounted on roller bearings 3, 3'. Bolted to one wheel disc is a driving plate 4 having integral therewith an axially-extending sleeve 5, the external diameter of which is slightly less than the internal diameter of the axle, and keyed to the internal surface of the sleeve is the solid truncated cone-shaped end 6 of a hollow shaft 7 which passes through the axle to the opposite end thereof, where it is flared outwardly to form a radially-extending annular plate 8. The shaft is rotatably mounted within the axle and the sleeve is secured to the shaft by a bolt 9 passing through the driving plate and engaging in a threaded hole in the cone-shaped end.

Fixed to the marginal portion of each face of the annular plate is an annular friction element and two similar elements are carried on adjacent faces of two annular backing members 10 secured one on each side of the plate by bolts passing through the member and plate. Between each adjacent pair of friction elements is an annular metal member 11 which is fixed to and extends inwardly from the internal peripheral surface of the wheel rim and which engages with the friction elements. Since the annular metal members are connected to one wheel and the plate and backing members to the other wheel the resistance to relative rotation of the two wheels may be adjusted by adjusting the bolts to alter the pressure between the friction surfaces.

Figure 2 shows a portion of another embodiment of the invention which is applicable to a wheel having a detachable tyre-retaining flange and which is otherwise similar to that shown in Figure 1. In this embodiment the marginal portion of the annular plate 8 is located between two annular friction elements, one of which is carried by the outer face of an inwardly-extending annular projection 12 of the flange which seats on a complementary portion of a radial extension of the rim and the other of which is carried by a separate annular backing member 13. The said member and the annular projection are secured by bolts 14 passing through the rim extension. In this embodiment the flange is free to move along the bolts and the resistance of the two wheels to relative rotation is dependent on the tyre pressure, which exerts an axial thrust on the friction surfaces through the pressure of the tyre bead on the retaining flange.

Figure 3 shows a third embodiment in which the air pressure in the tyre is employed to control the frictional resistance to relative rotation. According to this embodiment the rim is divided along a median plane normal to its axis, one portion 15 being integral with a wheel disc and the other 16 with an inwardly extending annular flange. The flange is bolted to the wheel disc by bolts 17 passing through the flange and disc and inwardly of the bolt holes the face of the flange adjacent the disc is cut away to form an annular cavity 18 opening inwardly, one wall and the base of the cavity being formed in the flange and the other wall being formed by the face of the disc.

Projecting into this cavity and located between an annular friction element fixed to the flange and another friction element attached to an annular backing plate 19 is the marginal portion of the annular plate, while bearing on the face of the backing plate remote from the friction element is an annular pressure member 20 slidably carried in an annular groove in the wheel disc. An annular seal 21 contacting with the pressure member is provided in the groove and the base of the groove is in communication with the interior of the tyre through a passage 22 so that the air pressure in the tyre serves to force the friction surfaces into engagement.

Having described my invention, what I claim is:

1. A twin wheel assembly which comprises a hollow axle, a pair of wheels rotatably mounted on said axle, a shaft extending axially within said axle, a plate rigidly secured to said shaft and to one of said wheels, a second plate rigidly mounted on said shaft, friction elements mounted on said second plate, and an annular member on the other of said wheels and in frictional engagement with said friction elements.

2. The twin wheel assembly of claim 1 in which said friction elements are relatively displaceable axially to said annular members to vary the friction thereagainst, and means displaceable by the pressure of a tire on said wheel to move said friction elements against said annular members.

3. The twin wheel assembly of claim 1 in which the friction elements are displaceable relatively in an axial direction against said annular member, and a slidable tire retaining flange bearing against said friction elements to press them against said annular member under the expansion of a tire on said wheel.

4. The twin wheel assembly of claim 1 in which said friction elements are displaceable against said annular element, an annular cylinder on said annular member and an annular piston in said cylinder bearing against said friction elements.

5. A twin wheel assembly which comprises a hollow axle, a pair of wheels rotatably mounted on said axle and spaced apart to provide a supporting zone, a hollow shaft positioned axially of said axle, a plate secured to said hollow shaft at one end of said axle and secured to one of said wheels, a plate fixed to said hollow shaft at the other end of said axle and having a number of spaced friction pads, and flanges from the other of said wheels extending between and engaging said friction pads.

6. A twin wheel assembly which comprises a hollow axle, a pair of wheels rotatably mounted on said axle and spaced apart to provide a supporting zone, a hollow shaft positioned axially of said axle, a plate secured to said hollow shaft at one end of said axle and secured to one of said wheels, a plate fixed to said hollow shaft at the other end of said axle and having a pair of friction pads mounted one on each opposite face thereof, an axially movable tire retaining flange on the free side of one of said friction pads, and a fixed flange engaging the free face of the other friction pad.

7. A twin wheel assembly which comprises a hollow axle, a pair of wheels rotatably mounted on said axle and spaced apart to provide a supporting zone, a hollow shaft positioned axially of said axle, a plate secured to said hollow shaft at one end of said axle and secured to one of said wheels, a plate fixed to said hollow shaft at the other end of said axle and having a pair of friction pads one on each face of said second plate, a fixed flange on the other of said wheels in position to engage one of said friction pads, a backing plate and an annular piston mounted on said wheel and movable to press said backing plate into engagement with the other of said friction pads.

8. A twin wheel assembly which comprises a hollow axle, a pair of wheels rotatably mounted on said axle, a shaft extending axially within said axle, a plate rigidly connected to said shaft and to one of said wheels, a second plate rigidly connected to said shaft and a frictional coupling between said second plate and the other of said wheels.

9. A twin wheel assembly according to claim 8 which comprises an annular cylinder associated with the frictionally coupled wheel, means for connecting the cylinder to the interior of a tyre mounted on said wheel, and an annular piston displaceable in said cylinder and associated with said friction coupling, whereby the degree of friction in said coupling is controlled by the air pressure in said tyre.

HENRY JAMES BUTLER.

REFERENCES CITED

The following references are of record in the file of this patent:

UNITED STATES PATENTS

| Number | Name | Date |
|---|---|---|
| 1,206,895 | Nilson | Dec. 5, 1916 |
| 1,494,881 | Baines | May 20, 1924 |
| 1,733,845 | Welser | Oct. 29, 1929 |
| 2,132,029 | Higbee | Oct. 4, 1938 |
| 2,401,364 | Mercier | June 4, 1946 |
| 2,460,387 | Hunter | Feb. 1, 1949 |

FOREIGN PATENTS

| Number | Country | Date |
|---|---|---|
| 535,038 | Great Britain | Mar. 26, 1941 |
| 601,584 | Great Britain | May 10, 1948 |